Oct. 10, 1950

J. T. KRAPP 2,525,037

COUPLING

Filed April 17, 1947

INVENTOR.
JOHN T. KRAPP
BY Van Deventer & Gries
ATTORNEYS.

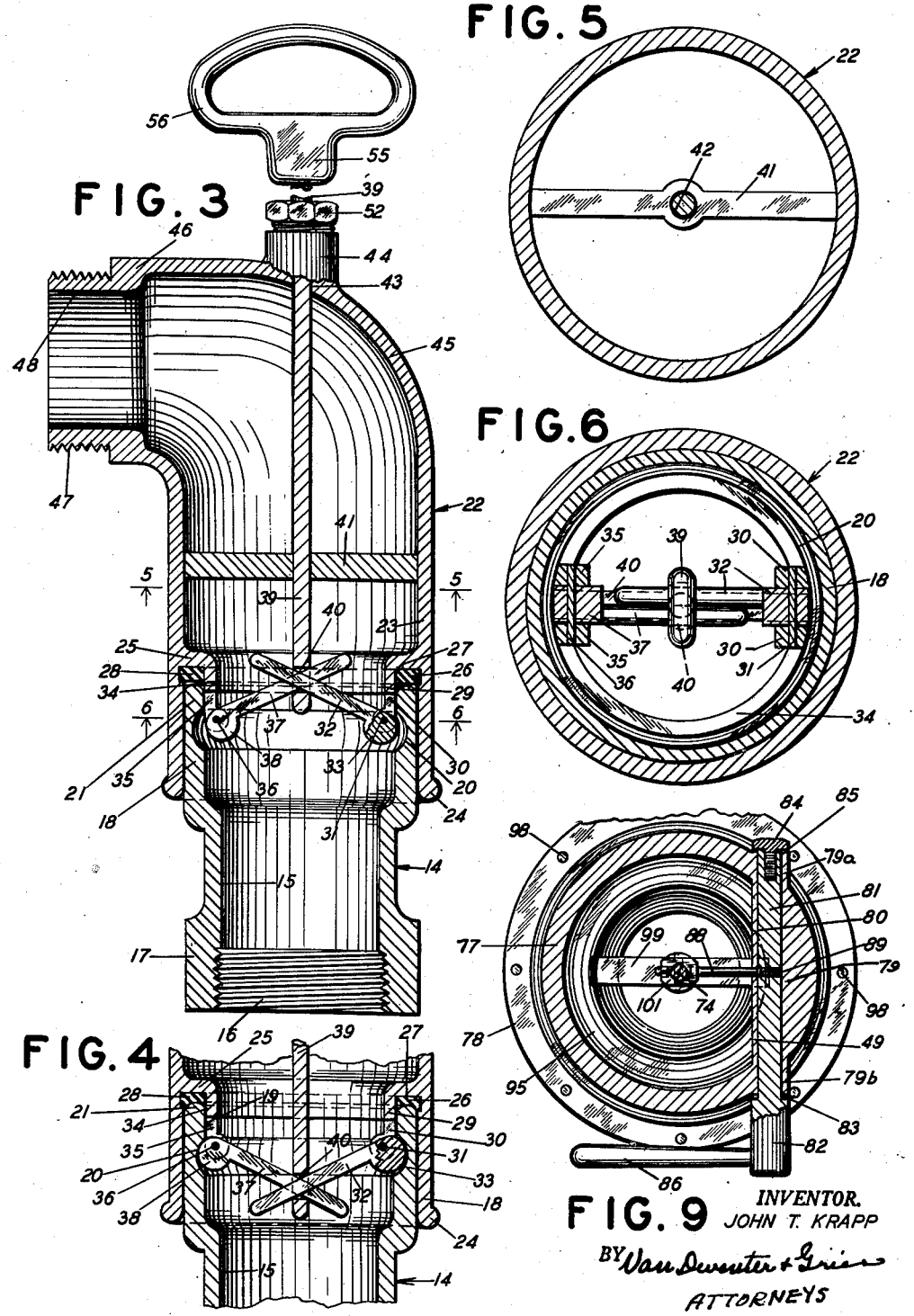

Oct. 10, 1950 J. T. KRAPP 2,525,037
COUPLING
Filed April 17, 1947 3 Sheets-Sheet 3
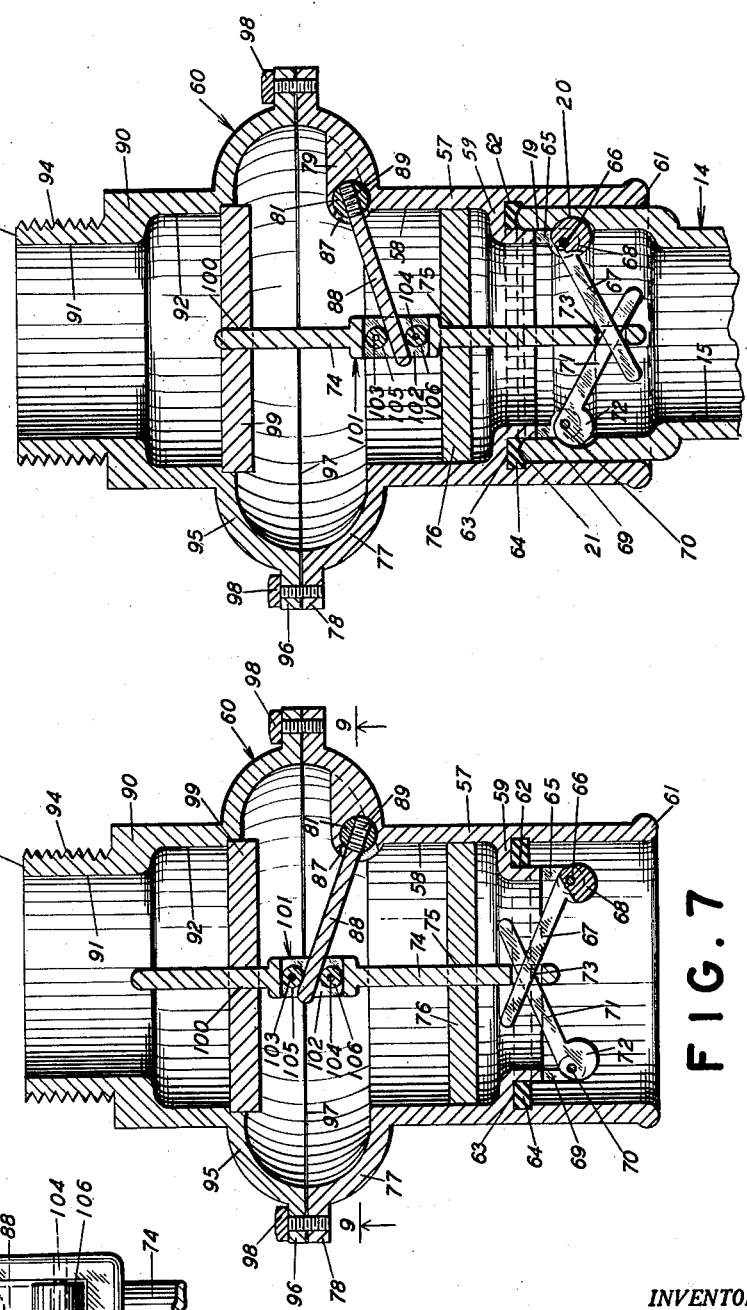
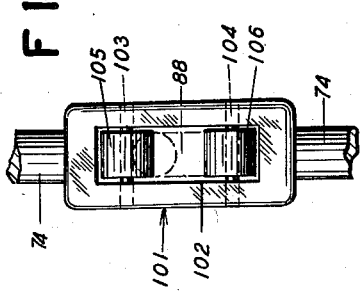
INVENTOR.
JOHN T. KRAPP
BY
ATTORNEYS.

Patented Oct. 10, 1950

2,525,037

UNITED STATES PATENT OFFICE 2,525,037

COUPLING

John T. Krapp, Port Washington, N. Y.

Application April 17, 1947, Serial No. 741,969

4 Claims. (Cl. 285—171)

This invention relates to improvements in coupling devices for coupling conduits and the like, and has for an object the provision of a quickly attachable and detachable coupling which is particularly adapted to be used in confined spaces.

In copending application Serial No. 684,233, filed on July 17, 1946, which matured into Patent 2,518,026, a coupling is shown wherein leverage members for clamping the couplings into sealing engagement are positioned on the outside of the body and extend outwardly therefrom. Therefore, said coupling must have sufficient space thereabout for said leverage members to be operated.

An object of the present invention is to position the leverage members for locking the two couplings together in sealed relation inside of one of the couplings, so that the new and improved coupling may be installed in confined spaces.

Yet another object of the invention is the provision of a separable coupling which includes lever operated cams inside one of the couplings and connected to vertical means adapted, when moved in one direction, to actuate said levers to secure the couplings in locked sealed relation, and when moved in the opposite direction, to unlock said couplings.

Other objects and advantages of the invention will be apparent to those skilled in the art from a study of the specification and the accompanying drawings.

Referring to the drawings:

Figure 3 is a cross-sectional elevation of the coupling of Figure 1, shown in section, the two couplings being positioned together before they are locked in sealed relation;

Figure 4 is a fragmentary, sectional view, similar to Figure 3, except that the two coupling members are forced together in sealed relation;

Figure 5 is a sectional view, taken along the lines 5—5 of Figure 3;

Figure 6 is a sectional view, taken along the lines 6—6 of Figure 3;

Figure 7 is a sectional elevation of the female member of a modified form of my new and improved coupling, with the levers and cams positioned to receive the end of the male coupling member;

Figure 7a is a fragmentary view, showing details of the intermediate portion of the lever actuating rod;

Figure 8 is a sectional view, similar to Figure 7, except that both members of the coupling are shown engaged and clamped together in sealed relation; and Figure 9 is a sectional view, taken along the lines 9—9 of Figure 7.

Figure 1:
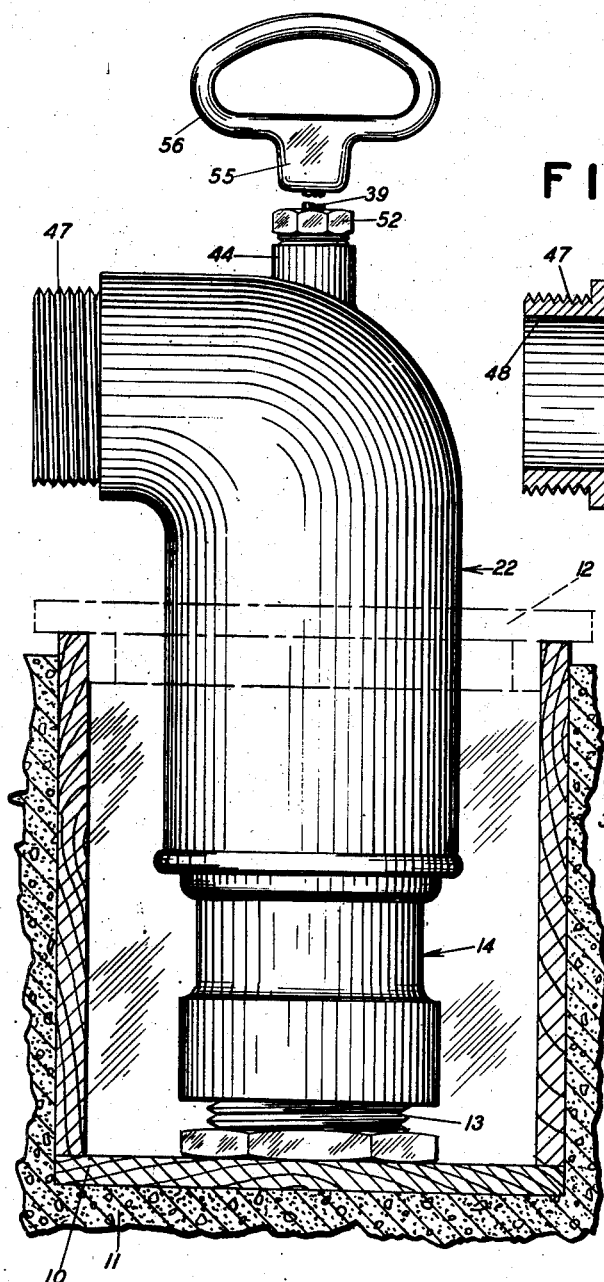
Figure 1 is an elevation of one form of my new and improved coupling.

Referring first to Figures 1 to 6, my new and improved coupling is particularly adapted for use in confined spaces, such, for example, as a box 10, which may be set into the ground 11 and which may be provided with a cover 12 when not in use. Extending through the bottom of the box 10 is the end 13 of a pipe or conduit connected to a source of liquid or gas under pressure.

The male fitting 14 of my new and improved coupling has an interior bore 15, the lower end of which communicates with an internally threaded portion 16, the outside of which is reinforced by a band 17 which is larger in diameter than the main body of the fitting 14. The upper end 18 of the fitting 14 is also larger in diameter than the main body of the fitting. Extending into the upper end 18 is a bore 19 and intermediate the ends of the bore 19 is formed an annular camming groove 20. The upper end face 21 of the fitting 14 may be curved, as shown, or it may be flat. The end 21 forms the seating face of the fitting which seats against an annular gasket formed in the female fitting 22, when the fittings are forced into sealing engagement with each other, in a manner to be presently described.

The member 22 is generally tubular in form in its lower portion, and has therein an interior passage 23. Spaced apart from the bottom edge 24 of the fitting 22 is an interior annular boss 25, which is bored out with an undercut bore 26 to form a shoulder 27 against which a gasket 28 may rest. Due to the fact that the bore 26 is undercut, there is no tendency for the gasket 28 to fall out. Formed integral with the annular boss 25 is a depending boss 29, which is bifurcated to form two legs, one of which is shown at 30, and these legs have aligned holes therein to accommodate a pin or shaft 31.

A lever 32 carries on its lower end thereof a cam 33 and has formed therein a hole which is journaled on the shaft 31. Oppositely disposed to the depending boss 29 within the fitting 22 is a second depending boss 34, which is also bifurcated to form two legs, one of which is shown at 35, and these legs, likewise, have aligned holes therein to accommodate a shaft 36.

A lever 37 carries on its lower end thereof a cam 38 having a hole therethrough which is journaled on the shaft 36. The levers 32 and 37 cross each other at a point lying on the vertical axis of the interior passage 23. The levers are offset laterally so that the adjacent faces thereof have a very slight clearance therebetween.

Extending vertically and substantially on the axis of the interior passage 23 is a rod 39 having a cross hole 40 formed therein, through which the crossed levers 32 and 37 pass. The rod 39 is adapted to actuate the levers 32 and 37 and consequently the size of the hole 40 is sufficient to allow free action of the levers from a position where the couplings are forced into sealing engagement (as will presently be described) to a position where the cams clear the interior surface 19 of the male fitting. This latter position is the position shown in Figure 2, and the first mentioned position is the position shown in Figure 4.

A cross web 41 is positioned within the passage 23 and spaced apart from the internal annular boss 25. Formed in the web 41 is a hole 42 (Figure 5) through which the rod 39 extends. The rod 39 also extends through a hole 43 formed in a boss 44. The lower annular wall of the fitting 22 has a surved portion 45 which joins a straight portion 46, which is substantially ninety degrees apart from the vertical wall of the fitting 22, and the wall 46 has a stepped portion 47 which may be threaded to accommodate the fitting and which has an interior bore 48 forming a passage for fluid mediums. The passage 48 is at right angles to the passage 23. It is preferable to form the body of the fitting 22 by means of a casting, and therefore the boss 44 is formed integral therewith. The boss 44 has a counterbored portion 49 for containing a gasket 50, and communicating with the counterbored portion 49 is a counterbored portion 51, which is provided with threads to accommodate a packing nut 52, and between the packing nut and the gasket 50, a gland 53 may be provided. The purpose of the packing is to permit the rod 39 to be moved up and down in a vertical path and yet prevent the fluid medium within the passages 23 and 48 from escaping to the atmosphere. The upper end of the rod 39 is provided with threads 54 which are engaged by corresponding threads formed in a boss 55, which is preferably formed integral with the handle 56.

Figure 2:
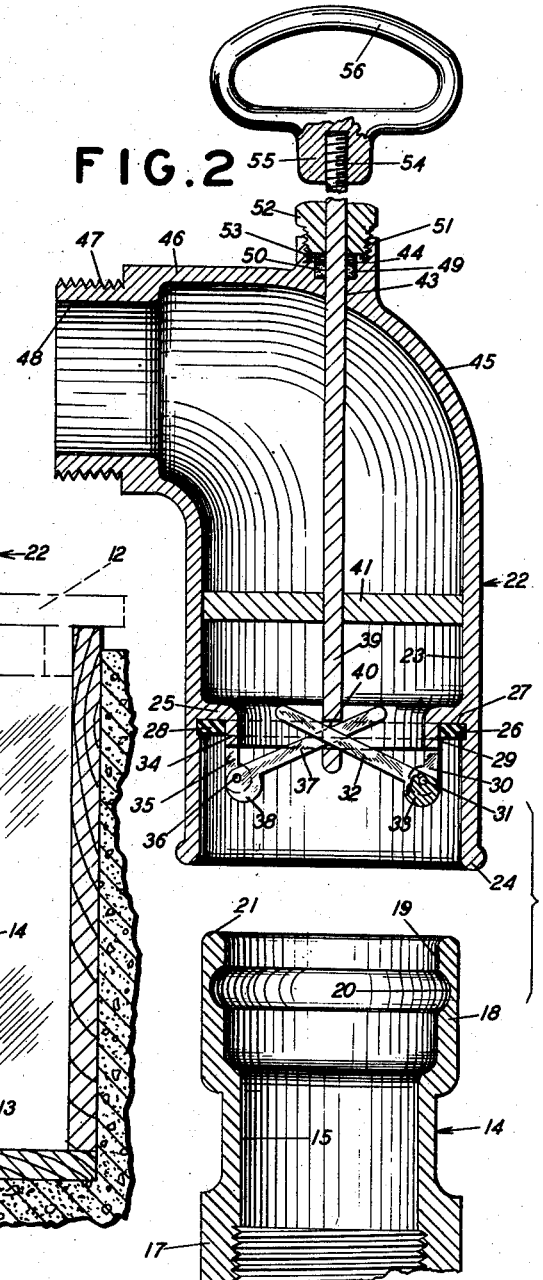
Figure 2 is a cross-sectional elevation of the coupling shown in Figure 1, wherein the two coupling members are separated.

In use, the cover 12 may be removed from the box 10, uncovering the fitting 14, and the fitting 22 may be applied therein, with the levers in the positions shown in Figure 2. As the fittings come together in this relation, they are in the positions shown in Figure 3.

As soon as the fitting 22 is seated on the male member 14, the handle 56 is forced downwardly to cause the levers to move downwardly, and thereby force the cams 33 and 38 into engagement with the annular groove 20 formed in the fitting 14, with the result that the fitting 22 is cammed downwardly with sufficient force to deform the gasket 28, and thereby effect a fluid-tight seal between the fittings.

In Figure 4, the levers have been forced downwardly and the cams have caused the gasket 28 to deform, and thereby sealing has been effected between the end 21 of the fitting 14 and the fitting 22.

From the above description, it will be clear that the form of fitting shown in Figures 1 to 6 is particularly adapted for use in confined spaces but, due to the fact that the actuating handle is in alignment with the axis of the interior passage 23, the fluid medium does not pass through in a straight line, but instead, is turned through an angle of ninety degrees.

Now, in the modification shown in Figures 7, 8 and 9, the fluid medium does pass through in a straight line.

Referring to Figures 7, 8 and 9, the male fitting is identical with the male fitting shown in Figures 1 to 6, and therefore the same numerals are applied thereto. The female part of the coupling is generally designated by the numeral 60, and may consist of a lower casting having a tubular portion 57 with a passage 58 therein. Spaced apart from the bottom end 61 of the tubular portion 57 is an internal annular boss 59, which is machined out with an undercut 62 forming a shoulder 63 upon which a sealing ring 64 is positioned.

Due to the undercut, the sealing ring is retained in position upon the shoulder 63. Formed integral with the annular boss 59 is a depending boss, which is bifurcated, one of the legs being indicated by the numeral 65, and extending through the bifurcated portions 65 are aligned holes to receive a shaft 66. A lever 67, having formed integral therewith a cam 68, has a hole therethrough which is journaled on the shaft 66. Substantially opposite the bifurcated legs 65 are similar legs 69 having aligned holes therethrough to accommodate a shaft 70. A lever 71 has a cam 72 formed integral therewith and has a hole therein which is journaled on the shaft 70. The levers 67 and 71 are offset with respect to each other, so that a slight clearance remains therebetween. These levers, as may be seen in Figure 7, cross each other, and extend through a hole 73 formed near the lower end of a vertical rod 74, which is reciprocally mounted in a bearing hole 75, formed in a cross web 76 (which is similar to the cross web 41, shown in Figure 5). Formed integral with the upper end of the tubular portion 57 is a curved wall 77, which terminates in a flange 78. Formed integral with the curved wall 77 is a boss 79 (Figure 9) which has extensions 79a and 79b extending outside of the wall 77. Extending through the boss 79 and the extensions 79a and 79b, is a bearing hole 80.

Journaled in the bearing 80 is a shaft 81 having an enlarged outer portion 82 with a shoulder therebetween, which bears on a sealing washer 83 between the shoulder and the end of the boss extension 79b. The other end of the shaft 81 has threads formed therein to receive a bolt 84, and a suitable washer 85 is positioned between the head of the bolt 84 and the end of the boss extension 79a. Extending from the enlarged portion 82 is an operating handle 86. The boss 79, intermediate the ends thereof, has an arcuate slot 87 formed therein providing clearance for a cross rod 88 (Figure 8) which has a threaded end 89 screwed into a correspondingly threaded hole formed in the shaft 81.

From the above description, it will be readily seen that an operator may, by means of the handle 86 outside of the fitting, swing the rod 88 up or down inside the fitting within the limits of the extremities of the slot 87. The fitting 60 also includes a tubular portion 90 having an interior bore 91 of one diameter and an interior bore 92 of a larger diameter, forming a step with the bore 91. The portion 90 has extending from the end 93 thereof, a length 94 of reduced diameter and threaded to be connected to a point of use. Although I show the threaded portion 94, it is obvious that if the device is to be connected to a member carrying a flange, it, likewise, should be flanged to match the same and if, on the other hand, the end 94 is to be connected to an externally threaded member, it would be internally threaded to match the same.

The lower end of the portion 90 has a curved extension 95 which terminates with a flange 96. The flange 96 may have a plurality of clearance holes formed therein, and matching these holes, are threaded holes formed in the flange 78, so that when the members are placed together with a gasket 97 therebetween, cap screws 98 may pass through the clearance holes in the flange 96 and engage the threaded holes in 78, and thereby the flanges may be forced into sealing engagement.

Bridging the passage 92, is a cross web 99, having a bearing hole 100 formed therein. This bearing hole is in vertical alignment with the bearing hole 75 in the cross web 76 so that the rod 74 may be reciprocated freely therein. The rod 74 has a midportion 101 which, as may be seen in Figure 7a, has a square yoke 102 formed therein, and journaled in the yoke 102 on cross shafts 103 and 104 are rollers 105 and 106, respectively. These rollers are so shaped that with the cross rod 88 therebetween, they will be actuated by the cross rod 88 and will not bind within the limits of the movement of the cross rod 88, as defined by the extremities of the slot 87.

The cross rod 88, as shown in Figure 7, has moved the vertical rod 74 upwardly, and due to the engagement of the levers 67 and 71 by the hole 73 formed in the lower end of the rod 74, the cams 68 and 72 are in a position to clear the inner wall of the male member 14.

In Figure 8, the fitting 60 is shown as applied to the male fitting 14, and the cross rod 88 is shown as swung downwardly (by the swinging downwardly of the handle 86 by an operator), the cams 68 and 72 having forced the members 60 and 14 into fluid-tight sealed engagement. Therefore, there is no leakage between the sealing ring 64 and the engaging end 21 of the male fitting.

Since the modification shown in Figures 7, 8 and 9 has been explained, it will be obvious that the path of the fluid medium through this form of coupling is in a straight line.

Although I have herein shown and described one form of my new and improved coupling and a modification thereof, it will be understood that many changes will be made in the arrangements herein shown and described within the scope of the appended claims.

What is claimed is:

1. In a separable coupling device, a tubular male member having a seating face on one end thereof and an annular camming face therein adjacent to said end, a female member including a tubular portion having an internal shoulder therein, a gasket on said shoulder adapted to be engaged by said seating face, cam means journaled in said tubular portion adjacent to said shoulder and having actuating levers formed integral therewith, said levers crossing each other substantially on the axis of said tubular portion, a push rod reciprocally mounted in said second mentioned member and having its axis substantially coinciding with the axis of said tubular portion and operatively connected to said levers, and an operating handle connected to said push rod on the exterior of said second mentioned member and adapted to be moved by an operator to operate said cam means for causing the latter to engage said camming face to force said seating face and said gasket into tractile engagement.

2. In a separable coupling device, a tubular male member having a seating face on one end and an annular camming face therein adjacent said end, a female member having a tubular portion and a portion angular with respect thereto, an internal shoulder formed in said tubular portion, a gasket on said shoulder adapted to be engaged by said seating face, oppositely disposed cams journaled in said tubular portion adjacent to said seating face, levers formed integral with said cams and crossing one another substantially on the axis of said tubular portion, a push rod reciprocally mounted in and disposed substantially along the axis of said second mentioned member, said push rod having an enlarged portion near the lower end thereof embracing said levers where they cross each other, a handle secured to the outer end of said push rod on the exterior of said second mentioned member, and a stuffing box formed in said second mentioned member to form between the latter and said push rod a fluid-tight joint, said handle being adapted to be operated to cause said cam means to engage said camming face and force said seating face and said gasket into fluid-tight engagement.

3. In a separable coupling device, a tubular male member having a seating face on one end thereof and an annular camming face therein adjacent said end, a female member having a straight passage therethrough, an internal shoulder formed in said last member adjacent to one end thereof, a gasket on said shoulder adapted to be engaged by said seating face, cam means journaled within said second member adjacent to said gasket, lever means movable with said cams and crossing each other on the axis of said second member, a shaft reciprocally carried by said second member on said axis, said shaft including a slot adapted to engage the crossed levers and including an enlarged portion spaced apart from said levers and slotted to accommodate an actuating rod, an actuating shaft journaled in said second member and extending beyond the exterior thereof, said actuating rod being secured to said shaft, and a handle on the exterior of said second member secured to said actuating shaft and adapted to be utilized for rotating said shaft to cause said actuating rod to move said first shaft axially to bring said cams into or out of engagement with said annular camming face in said first member.

4. A coupling according to claim 3, in which said slotted enlarged portion of said axial shaft has journaled therein spaced rollers adapted to be contacted by said actuating rod.

JOHN T. KRAPP.

REFERENCES CITED

The following references are of record in the file of this patent:

UNITED STATES PATENTS

| Number | Name | Date |
|---|---|---|
| 310,672 | Hackley | Jan. 13, 1885 |
| 1,202,601 | Snyder | Oct. 24, 1916 |